(12) United States Patent
Gross et al.

(10) Patent No.: US 10,581,251 B2
(45) Date of Patent: Mar. 3, 2020

(54) BATTERY PACK ACTIVE THERMAL MANAGEMENT SYSTEM

(71) Applicants: Oliver Gross, Oxford, MI (US); Dan Pannunzio, Kingsville (CA); Steven L Clark, Birmingham, MI (US); Roger Cortina, LaSalle (CA)

(72) Inventors: Oliver Gross, Oxford, MI (US); Dan Pannunzio, Kingsville (CA); Steven L Clark, Birmingham, MI (US); Roger Cortina, LaSalle (CA)

(73) Assignee: FCA US LLC, Auburn Hills, MI (US)

( * ) Notice: Subject to any disclaimer, the term of this patent is extended or adjusted under 35 U.S.C. 154(b) by 1004 days.

(21) Appl. No.: 14/574,572

(22) Filed: Dec. 18, 2014

(65) Prior Publication Data

US 2016/0181835 A1    Jun. 23, 2016

(51) Int. Cl.
| H02J 7/00 | (2006.01) |
| H01M 10/6563 | (2014.01) |
| H01M 10/6567 | (2014.01) |
| H01M 10/667 | (2014.01) |
| H01M 10/625 | (2014.01) |
| H01M 10/658 | (2014.01) |
| H01M 10/6572 | (2014.01) |

(52) U.S. Cl.
CPC ......... *H02J 7/0013* (2013.01); *H01M 10/625* (2015.04); *H01M 10/658* (2015.04);
(Continued)

(58) Field of Classification Search
CPC .......... H01M 10/625; H01M 2220/20; H01M 10/6572; H01M 10/658; H01M 10/667;
(Continued)

(56) References Cited

U.S. PATENT DOCUMENTS

| 5,229,702 A | 7/1993 | Boehling et al. |
| 7,867,633 B2 | 1/2011 | Park et al. |
| (Continued) | | |

FOREIGN PATENT DOCUMENTS

| DE | 10114960 C1 | 8/2002 |
| EP | 2133952 A1 | 12/2009 |
| WO | 20130113618 A1 | 9/2013 |

OTHER PUBLICATIONS

International Search Report and Written Opinion dated Mar. 17, 2016 for International Application No. PCT/US2015/065488, International Filing Date Dec. 14, 2015.

*Primary Examiner* — Drew A Dunn
*Assistant Examiner* — Sailesh Thapa
(74) *Attorney, Agent, or Firm* — Ralph E Smith

(57) ABSTRACT

A battery pack having an active thermal management system for use with a hybrid vehicle is provided. The active thermal management system is self-contained within a housing of the battery pack and includes a thermal channel configured to provide fluid communication between an interior of the housing and an exterior of the housing of the battery pack; a set of thermoelectric devices configured to transfer heat from battery cells of the battery pack to the thermal channel; an insulator arranged between the battery cells and the thermal channel; a device configured to control fluid flow via the thermal channel; and a controller configured to control the device to actively control heat transfer from the interior of the housing to the exterior of the housing of the battery pack to maintain the battery pack at a desired temperature.

15 Claims, 2 Drawing Sheets

(52) U.S. Cl.
CPC ... *H01M 10/6563* (2015.04); *H01M 10/6567* (2015.04); *H01M 10/6572* (2015.04); *H01M 10/667* (2015.04)

(58) Field of Classification Search
CPC .......... H01M 10/6567; H01M 10/6563; H02J 7/0013
USPC .......... 429/62, 120; 320/154, 113, 115, 163
See application file for complete search history.

(56) References Cited

U.S. PATENT DOCUMENTS

| | | | | |
|---|---|---|---|---|
| 2006/0078786 | A1* | 4/2006 | Wu | H01M 2/1022 429/62 |
| 2008/0311466 | A1* | 12/2008 | Yang | H01M 10/486 429/62 |
| 2009/0087727 | A1* | 4/2009 | Harada | H01M 2/1077 429/120 |
| 2010/0291414 | A1* | 11/2010 | Bell | H01M 2/1077 429/7 |
| 2011/0244300 | A1 | 10/2011 | Closek | |
| 2011/0300420 | A1 | 12/2011 | Johnson, Jr. | |
| 2012/0148881 | A1* | 6/2012 | Quisenberry | F28D 15/0233 429/50 |
| 2014/0363719 | A1* | 12/2014 | Kwak | H01M 10/5016 429/120 |
| 2016/0064783 | A1* | 3/2016 | Chorian | H01M 10/625 429/72 |
| 2016/0093929 | A1* | 3/2016 | Obasih | H01M 10/5067 429/120 |
| 2016/0107508 | A1* | 4/2016 | Johnston | B60H 1/00278 165/202 |

* cited by examiner

BATTERY PACK ACTIVE THERMAL MANAGEMENT SYSTEM

FIELD

The present application relates generally to mild hybrid vehicles and, more particularly, to active thermal management systems for battery packs.

BACKGROUND

A mild hybrid vehicle includes an engine configured for propulsion and an electric motor configured to assist the engine. One type of mild hybrid vehicle includes a belt-driven starter generator (BSG) unit. The BSG unit utilizes the electric motor to selectively provide power to a crankshaft of the engine (e.g., via a belt). The BSG also replaces a conventional alternator and thus could be used for start-stop of the engine, power assist, and/or regenerative braking, as well as powering other vehicle components. The BSG unit is powered by a battery pack, such as a 48 volt battery pack.

Because the electric motor and battery pack are part of the BSG unit, the battery pack is located in a high temperature environment proximate the engine and therefore requires cooling. Conventional cooling systems capable of handling such cooling needs, such as a heating, ventilation, and air conditioning (HVAC) system or other refrigerant-based system, however, are too large to meet the small packing size requirements or today's vehicles. Therefore, while such thermal management systems work for their intended purpose, there remains a need for improvement in the relevant art.

SUMMARY

In accordance with an aspect of the invention, a battery pack for use with a hybrid vehicle is presented. The battery pack includes a housing and an active thermal management system contained within the housing. In one exemplary implementation, the active thermal management system includes a thermal channel configured to provide fluid communication between an interior of the housing of the battery pack and an exterior of the housing of the battery pack, a set of thermoelectric devices (TEDs) configured to transfer heat from battery cells of the battery pack to the thermal channel, an insulator arranged between the battery cells and the thermal channel, a device configured to control fluid flow via thermal channel, and a controller configured to control the device to actively control heat transfer from the interior of the housing of the battery pack to the exterior of the housing of battery pack to maintain the battery pack at a desired temperature.

In some implementations, the thermal channel is an air channel. In some implementations, the device is a fan configured to control the fluid flow of air through the air channel. In other implementations, the thermal channel is a liquid channel comprising a non-refrigerant liquid. In some implementations, the device is a radiator or a pump configured to control the fluid flow of the non-refrigerant liquid through the liquid channel. In some implementations, the non-refrigerant liquid comprises a mixture of water and glycol. In some implementations, the non-refrigerant liquid consists of approximately 50% water and 50% glycol. In some implementations, the non-refrigerant liquid is conditioned to a temperature less than an ambient temperature.

In some implementations, the active thermal management system further includes a set of cooling fins connected to the set of TEDs and disposed proximate the thermal channel. In some implementations, the TEDs include Peltier junctions. In some implementations, the thermal channel is an at least partially hollow tube or a thermal plate. In some implementations, the insulator is one of an insulating material and an air gap. In some implementations, the TEDs are further configured to transfer heat generated by a direct current (DC) to DC converter of the battery pack to the thermal channel. In some implementations, the battery cells collectively output approximately 48 volts.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, there remains a need for a thermal management system capable of fitting in a small packaging of a battery pack while also providing substantial cooling for operation in a high temperature environment proximate an engine. Accordingly, smaller, effective battery pack active thermal management systems are presented. These active thermal management systems are small enough to fit on-board in a housing of the battery pack (along with the battery cells and a DC-DC converter). In one exemplary implementation, the active thermal management systems utilize thermoelectric devices (TEDs), such as Peltier junctions, to transfer heat from the battery cells to an air-cooled or non-refrigerant-cooled thermal channel. The resulting battery pack has decreased size and mass, as well as decreased costs. In one exemplary implementation, the battery pack is a self-contained system advantageously including the active thermal management system within the housing. Further, the active thermal management systems are all electric (except for an optional fan or radiator and/or fluid pump) and do not require phase-changing of a refrigerant liquid.

Figure 1:
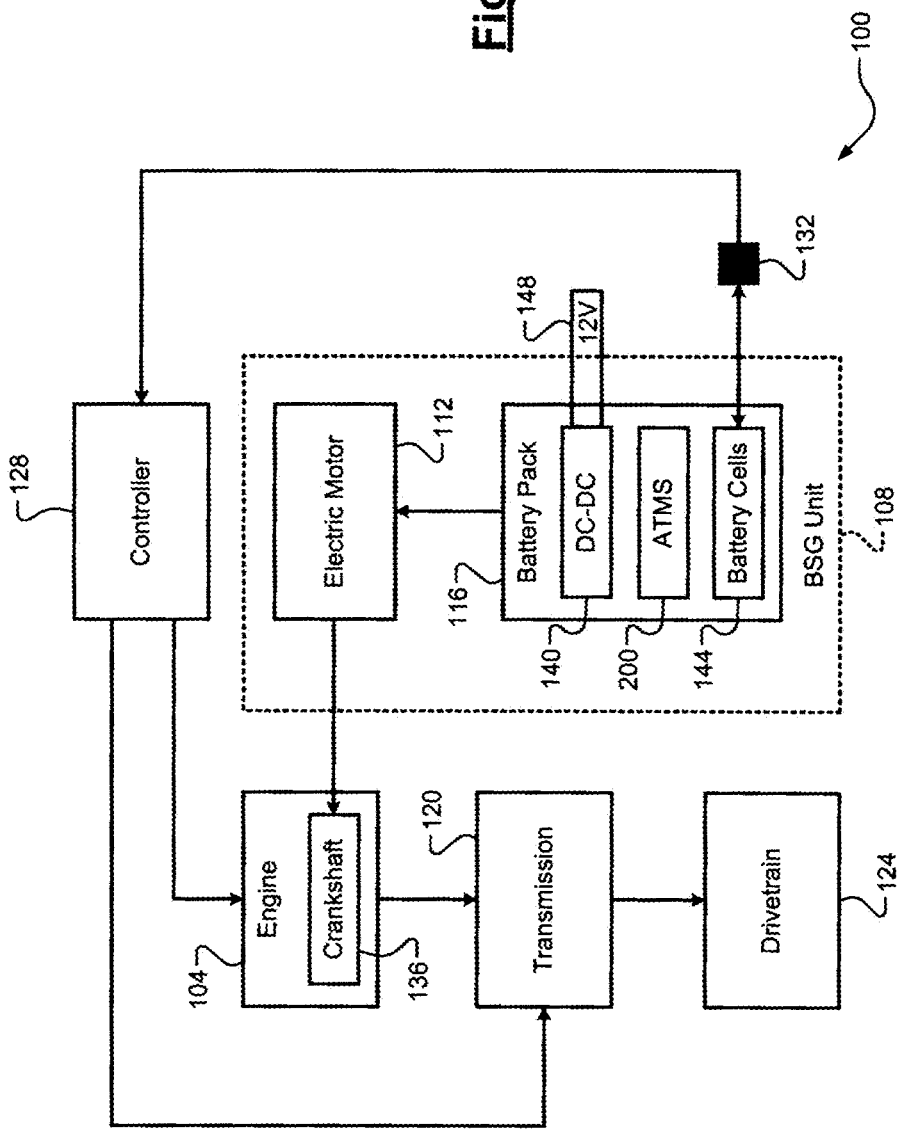
FIG. 1 is an example functional block diagram of a vehicle including a battery pack having an active thermal management system according to the principles of the present disclosure.

Referring now to FIG. 1, an example functional block diagram of a vehicle 100 is illustrated. In one exemplary implementation, the vehicle 100 is a mild hybrid vehicle. The vehicle 100 includes an engine 104 and a BSG unit 108 comprising an electric motor 112 and a battery pack 116. While a BSG mild hybrid configuration for the vehicle 100 is illustrated and described herein, it will be appreciated that the vehicle 100 could be any suitable electrified vehicle having the electric motor 112 and the battery pack 116. In one exemplary implementation, the vehicle 100 could be a battery electric vehicle (BEV) or plug-in hybrid electric vehicle (PHEV) utilizing the electric motor 112 and the battery pack 116 at least partially for propulsion of the vehicle 100 and the engine 104 for recharging the battery pack 116. The vehicle 100 also includes a transmission 120, a drivetrain 124, a controller 128, and a temperature sensor 132 configured to measure a temperature of the battery pack 116.

The engine 104 is any suitable internal combustion engine (gasoline, diesel, etc.) configured to generate drive torque. The drive torque is transferred to the drivetrain 124 via the transmission 120. Under certain operating conditions, the controller 128 commands the engine 104 to stop. Examples of these operating conditions are the vehicle 100 being stopped for a period, such as at a red light. Once the operating condition changes, the controller 124 commands the engine 104 to restart by commanding the BSG unit 108 to restart the engine 104. Examples of inputs for detecting these operating conditions include vehicle speed, accelerator pedal position, and brake pedal position. This starting and restarting of the engine 104 is also known as "start-stop operation." The BSG unit 108 provides for faster restarts of the engine 104, and thus a driver of the vehicle 100 is unaware or less aware that the engine 104 is ever stopped and/or restarted.

Specifically, the BSG unit 108 is configured to selectively provide power to a crankshaft 136 of the engine 104. Thus, the BSG unit 108 is arranged in place of a conventional alternator (not shown) of the engine 104. The BSG unit 108, therefore, further includes a direct current (DC) to DC converter 140. The DC-DC converter 140 is configured to step-down a voltage of the battery pack 116 to a lower voltage suitable for powering components of the vehicle 100 and/or recharging a 12 volt lead-acid battery. In one exemplary implementation, a 12 volt powernet 148 runs from the DC to DC converter 140 to an outside of the BSG unit 108 and the 12 volt powernet 148 could be used, for example, to recharge a 12 volt lead-acid battery and/or to power low voltage components.

The battery pack 116 includes a plurality of battery cells 144 that collectively output a voltage (e.g., approximately 48 volts). Therefore, the proximate arrangement of the battery pack 116 to the engine 104 could create an issue for the temperature-sensitive battery cells 144 without adequate cooling. Severe or extreme vehicle operating conditions (severe or extreme ambient temperatures, aggressive engine operation, etc.) could also create issues for the temperature-sensitive battery cells 144. Moreover, this arrangement creates packaging issues due to limited engine compartment space. Thus, the battery pack 116 includes an active thermal management system (also referred to as "ATMS") 200, which is described in greater detail below.

Figure 2:
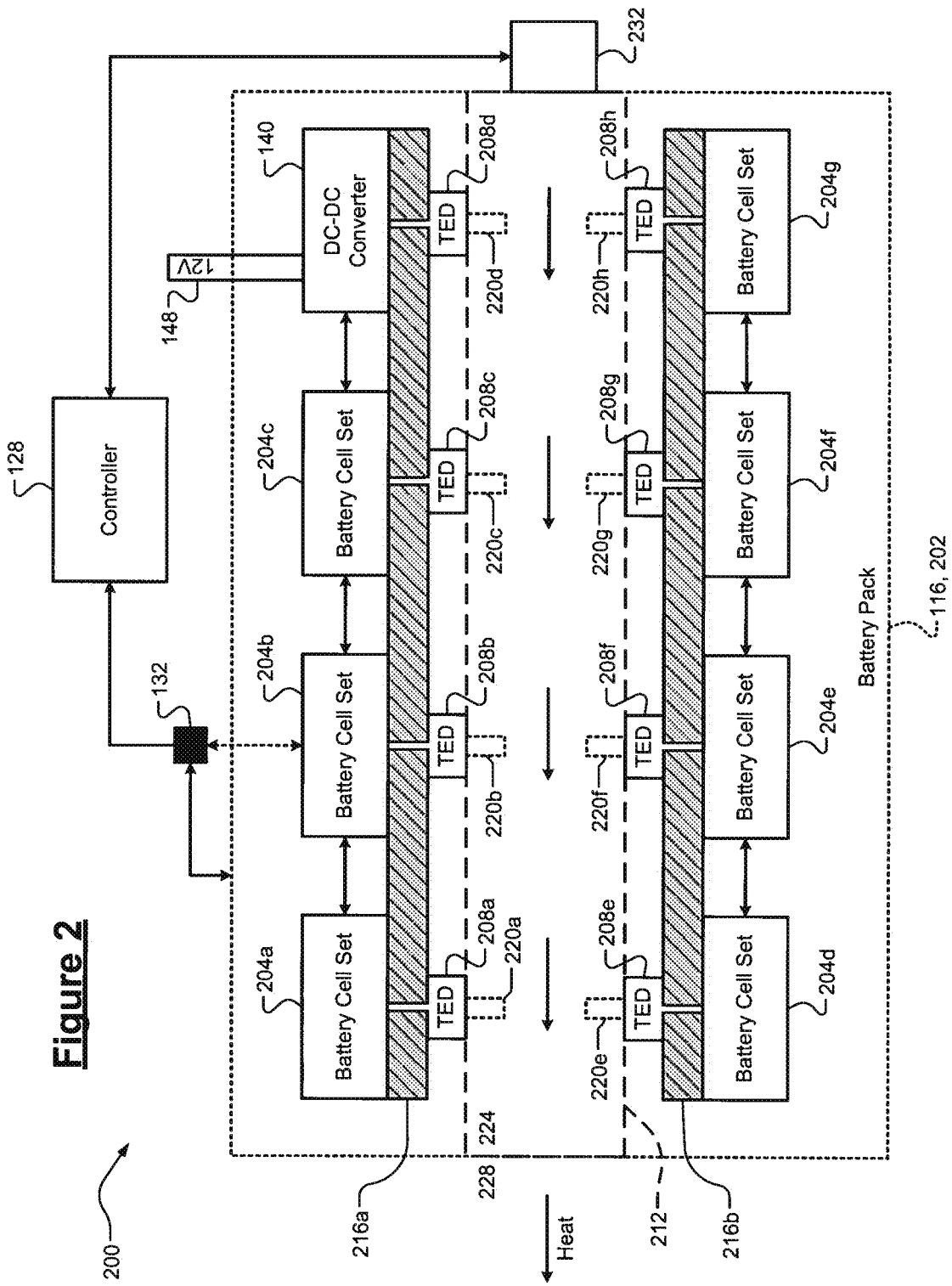
FIG. 2 is an example diagram of the active thermal management system for the battery pack according to the principles of the present disclosure.

Referring now to FIG. 2, an example diagram of an active thermal management system 200 for the battery pack 116 is illustrated. The battery cells 144 of the battery pack 116 are divided into one or more sets of battery cells, for example, sets of battery cells 204a-204g (collectively "sets of battery cells 204"). While the ATMS 200 is illustrated as including the battery cells 144 divided into the sets of battery cells 204 and the DC-DC converter 140 within a housing 202 of the battery pack 116, it will be appreciated that the ATMS 200 could include only the other illustrated components, which are also described in greater detail below. Similarly, while the ATMS 200 is illustrated as including the controller 128 of the vehicle 100, it will be appreciated that the active thermal management system 200 could include its own standalone controller (either on-board or off-board), such as a standalone controller for the battery pack 116.

The ATMS 200 includes one or more TEDs, for example, TEDs 208a-208h (collectively "TEDs 208"). In one exemplary implementation, the TEDs include Peltier junctions. The TEDs 208 are configured to transfer heat from the sets of battery cells 204 to a thermal channel 212. Examples of the thermal channel 212 include an at least partially hollow tube and a thermal plate. In the illustrated example, the sets of battery cells 204 are divided into parallel rows on opposing sides of the thermal channel 212. In one exemplary implementation, the DC-DC converter 140 is configured to share a common heat sink with one of the sets of battery cells 204 (e.g., set of battery cells 204c) and thus one of the TEDs 208 (e.g., TED 208c) is also shared to transfer heat generated by the DC-DC converter 140 to the thermal channel. The DC-DC converter 140, however, could also have its own TED (e.g., TED 208d). In one exemplary implementation, the TEDs 208 are also configured to transfer heat from the thermal channel 212 to the sets of battery cells 204 (e.g., to quickly heat cold sets of battery cells 204).

In one exemplary implementation, one or more insulators are arranged between the sets of battery cells 204 and the thermal channel 212, for example, insulators 216a-216b (collectively "insulators 216"). The DC-DC converter 140 could also be arranged in this parallel configuration, or could be arranged in another suitable location (e.g., above the sets of battery cells 204). Examples of the insulators 216 include any suitable insulating material and an air gap. In other words, the insulators 216 are configured to insulate the sets of battery cells 204 from the thermal channel 212, except for heat transfer via the TEDs 204. In one exemplary implementation, the TEDs 204 are coupled to or in communication with cooling fins, for example, cooling fins 220a-220h. The term "cooling fin" as used herein refers to any device configured to augment the heat transfer from the TEDs 208 to the thermal channel 212.

The thermal channel 212 is configured for a fluid communication between an interior 224 of the battery pack 116 and an exterior 228 of the battery pack 116. The thermal channel 212 comprises a conductive material, such as a lightweight metal (e.g., aluminum). In one exemplary implementation, the controller 128 is configured to monitor the temperature of the battery pack 116 (or the sets of battery cells 204) using the temperature sensor 132. Examples of the thermal channel 212 include an air channel comprising air or another gas mixture and a liquid channel comprising a non-refrigerant liquid. The term "non-refrigerant liquid" refers to a liquid that does not change phases during the heat transfer (cooling) process. One example of the non-refrigerant liquid is a mixture of water and glycol. In one exemplary implementation, the mixture is approximately 50% water and 50% glycol. Other suitable non-refrigerant liquids and/or mixtures could also be used.

In one exemplary implementation, the non-refrigerant liquid is conditioned (e.g., cooled) to a temperature below an ambient temperature, but it will be appreciated that the non-refrigerant liquid could also be unconditioned. In one exemplary implementation, the ATMS 200 also includes a device 232 configured to control a fluid flow via thermal channel 212. One example of the device 232 is a fan or other blower device configured to control the air or gas flow through an air/gas channel configuration of the thermal channel 212. Another example of the device 232 is a radiator and/or a fluid pump configured to control the non-refrigerant liquid flow through a liquid channel configuration of the thermal channel 212. This configuration could also include a return line and a tank (not shown) to return/supply the non-refrigerant liquid.

By transferring heat from the sets of battery cells 204 and, in some cases, the DC-DC converter 140, to the exterior 228 of the battery pack 116, the temperature of the battery pack 116 is able to be maintained below a temperature threshold. In one exemplary implementation, the controller 128 is configured to control the device 232 to actively control the heat transfer from the interior 224 of the battery pack 116 to the exterior 228 of the battery pack 116 to maintain the battery pack at a desired temperature. This desired temperature could be predetermined or calculated based on other operating parameters. Example control strategies include controlling the device 232 to increase a speed of the air/gas or liquid flow to increase the heat transfer and thus the cooling of the battery pack 116.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A battery pack for use with a hybrid vehicle, the battery pack comprising:
    a housing;
    a plurality of battery cells contained within the housing, the plurality of battery cells being divided into first and second sets of battery cells;
    a direct current to direct current (DC-DC) converter contained within the housing; and
    an active thermal management system contained within the housing, the active thermal management system including:
        a single thermal channel arranged through a center portion of the battery pack with the first set of battery cells arranged on a first side of the thermal channel and the second set of battery cells arranged on an opposing second side of the thermal channel, the thermal channel being configured to provide fluid communication between an interior of the housing of the battery pack and an exterior of the housing of the battery pack;
        a set of thermoelectric devices (TEDs) configured to transfer heat from the plurality of battery cells and the DC-DC converter to the thermal channel;
        an insulator arranged between each of the first and second sets of battery cells and the thermal channel and between the DC-DC converter and the thermal channel;
        a device configured to control fluid flow via the thermal channel; and
        a controller configured to control the device to actively control heat transfer from the interior of the housing of the battery pack to the exterior of the housing of the battery pack to maintain the battery pack at a desired temperature.

2. The battery pack of claim 1, wherein the active thermal management system further includes a set of cooling fins connected to the set of TEDs and disposed proximate the thermal channel.

3. The battery pack of claim 1, wherein the thermal channel is an air channel.

4. The battery pack of claim 3, wherein the device is a fan configured to control the fluid flow of air through the air channel.

5. The battery pack of claim 1, wherein the thermal channel is a liquid channel comprising a non-refrigerant liquid.

6. The battery pack of claim 5, wherein the device is a radiator or a pump configured to control the fluid flow of the non-refrigerant liquid through the liquid channel.

7. The battery pack of claim 6, wherein the non-refrigerant liquid comprises a mixture of water and glycol.

8. The battery pack of claim 7, wherein the non-refrigerant liquid consists of approximately 50% water and 50% glycol.

9. The battery pack of claim 6, wherein the non-refrigerant liquid is conditioned to a temperature less than an ambient temperature.

10. The battery pack of claim 1, wherein the TEDs include Peltier junctions.

11. The battery pack of claim 1, wherein the thermal channel is an at least partially hollow tube or a thermal plate.

12. The battery pack of claim 1, wherein the insulator is one of an insulating material and an air gap.

13. The battery pack of claim 1, wherein the plurality of battery cells collectively output approximately 48 volts.

14. The battery pack of claim 1, wherein the DC-DC converter is arranged on one of the first side of the thermal channel and the second opposing side of the thermal channel.

15. The battery pack of claim 1, wherein the DC-DC converter is arranged on the first side of the thermal channel, and wherein the first set of battery cells includes fewer battery cells than the second set of battery cells in order to account for space occupied by the DC-DC converter.

* * * * *